United States Patent [19]

Yokoyama

[11] Patent Number: 4,827,256

[45] Date of Patent: May 2, 1989

[54] SOUND TRANSMISSION METHOD FOR DATA WAY SYSTEM

[75] Inventor: Makoto Yokoyama, Setoshi, Japan

[73] Assignee: Kawamura Electric Industry Co., Ltd., Aichi, Japan

[21] Appl. No.: 862,622

[22] Filed: May 13, 1986

[30] Foreign Application Priority Data

Aug. 2, 1985 [JP] Japan .................................. 60-171471

[51] Int. Cl.$^4$ ......................... G05B 23/02; H04Q 5/00
[52] U.S. Cl. ......................... 340/825.07; 340/825.08; 340/825.52; 340/825.51; 381/77
[58] Field of Search ............... 340/825.07, 825.06, 340/825.08, 825.1, 825.52, 825.54, 505, 518, 825.51, 825.5; 370/89, 110.1; 381/77, 82

[56] References Cited

U.S. PATENT DOCUMENTS

| | | | |
|---|---|---|---|
| 3,529,293 | 9/1970 | Sullivan et al. | 340/825.07 |
| 3,559,177 | 1/1971 | Benson | 340/825.07 |
| 4,530,045 | 7/1985 | Petroff | 340/825.07 |
| 4,595,921 | 6/1986 | Wang et al. | 340/825.08 |
| 4,683,531 | 7/1987 | Kelch et al. | 340/825.08 |

FOREIGN PATENT DOCUMENTS 56-32856 4/1981 Japan .................................. 340/825.08
1114522 5/1968 United Kingdom .

OTHER PUBLICATIONS

Farr et al., IBM Technical Disclosure Bulletin; vol. 20; No. 2; Jul. 1977; p p. 773–774.

*Primary Examiner*—Robert L. Griffin
*Assistant Examiner*—Ralph E. Smith
*Attorney, Agent, or Firm*—Lahive & Cockfield

[57] ABSTRACT

A sound transmission method is carried out in a data way system comprising at least one controller, more than two data input modules and more than two data output modules all of which are connected to one another by a series of data transmission lines making a single loop while linking them together. The data input modules and output modules each are given an address. One or some of the data input modules are constructed as a sound input module or modules, while one or some of the data output modules are constructed as a sound output module or modules. The controller specifies the addresses of the sound input and output modules more frequently than those of the other data input and output modules.

5 Claims, 3 Drawing Sheets

| CONVENTIONAL METHOD | METHOD ACCORDING TO THE INVENTION |
|---|---|
| ADDRESS 0 IS SPECIFIED. | ADDRESS 0 IS SPECIFIED. |
| DATA | DATA |
| ADDRESS 1 IS SPECIFIED. | ADDRESS 1 IS SPECIFIED. |
| DATA | DATA |
| ADDRESS 2 IS SPECIFIED. | ADDRESS 0 IS SPECIFIED. |
| DATA | DATA |
| ADDRESS 3 IS SPECIFIED. | ADDRESS 2 IS SPECIFIED |
| DATA | DATA |
| | ADDRESS 0 IS SPECIFIED. |
| | DATA |
| ADDRESS X IS SPECIFIED. | ADDRESS 3 IS SPECIFIED. |
| DATA | DATA |
| ADDRESS 0 IS SPECIFIED. | ADDRESS 0 IS SPECIFIED. |
| DATA | DATA |

FIG. 1

| CONVENTIONAL METHOD | METHOD ACCORDING TO THE INVENTION |
|---|---|
| ADDRESS 0 IS SPECIFIED. | ADDRESS 0 IS SPECIFIED. |
| DATA | DATA |
| ADDRESS 1 IS SPECIFIED. | ADDRESS 1 IS SPECIFIED. |
| DATA | DATA |
| ADDRESS 2 IS SPECIFIED. | ADDRESS 0 IS SPECIFIED. |
| DATA | DATA |
| ADDRESS 3 IS SPECIFIED. | ADDRESS 2 IS SPECIFIED |
| DATA | DATA |
| ⋮ | ADDRESS 0 IS SPECIFIED. |
| | DATA |
| ADDRESS X IS SPECIFIED. | ADDRESS 3 IS SPECIFIED. |
| DATA | DATA |
| ADDRESS 0 IS SPECIFIED. | ADDRESS 0 IS SPECIFIED. |
| DATA | DATA |

FIG. 2

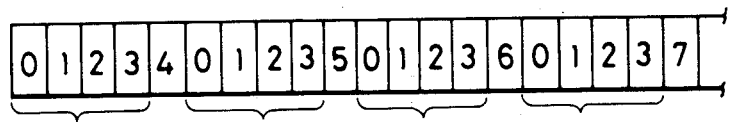

SOUND TRANSMISSION METHOD FOR DATA WAY SYSTEM

FIELD OF THE INVENTION

This invention relates to a sound transmission method for a data way system.

BACKGROUND OF THE INVENTION

Recently, a data way system has come into use for input of data from a number of data input modules (e.g., temperature sensors) and transmission thereof to a number of data output modules (e.g., various meters on a concentrated indicator panels). In such a system, a series of data transmission lines connect a controller and the data modules to one another while making a loop. Each data module is given its own unique address, and a data is transmitted from an addressed data input module to an addressed data output module in a time-divided manner.

The addresses of the modules are specified by the controller. There is a case where the module addresses are provided into the controller from outside. Usually, however, the controller has a built-in address counter for specifying the module addresses. In the latter case, the more modules are connected to the data transmission lines, the longer are the intervals between the addressings of modules and, hence, the more difficult it is to transmit data at a higher rate. A sound module would have to be addressed at a frequency of 8 KHz or more in order to transmit sound with such a quality as is substantially equal to that of the sound obtained by a telephone. For addressing the modules at such a high frequency in the foregoing latter case, it is necessary either to reduce the number of the modules connected to the transmission lines or to increase the standard rate of clock in the controller. However, it is not desirable to reduce the modules because it would reduce the amount of data that can be input and output, and nor is it desirable to increase the clock rate because it would require the interface circuits of the modules to be modified accordingly and, hence, at least require the existing data way system to be substantially modified.

SUMMARY OF THE INVENTION

Accordingly, the primary object of the invention is to provide a sound transmission method which can be effectively applied to existing data way systems without modifying the systems in any substantial ways and without reducing the number of the modules.

The sound transmission method according to the invention is carried out in a data way system comprising at least one controller, more than two data input modules and more than two data output modules all of which are connected to one another by means of a series of data transmission lines substantially making a single loop while linking them together. Each module has a unique address assigned thereto in advance and the controller is adapted to specify the address of any one of the data input modules to input a data therefrom and to specify the address of any one of the data output modules to transmit said data thereto, one or some of the data input modules each including a sound-to-electricity converter such as a microphone, a low-pass filter circuit and an analog-to-digital converting circuit so as to provide a sound input module or modules, and one or some of the data output modules each including a digital-to-analog converting circuit and an electricity-to-sound converter so as to provide a sound output module or modules. The sound transmission method according to the invention is characterized in addressing the sound input and output modules more frequently than the other data input and output modules.

Other objects of the invention will become apparent upon consideration of a detailed description of the invention which will follow.

BRIEF DESCRIPTION OF THE DRAWINGS

FIG. 1 shows the fundamentals of a sound transmission method according to the invention;

FIG. 2 shows the order of specifying addresses for obtaining a 4-channel talking system by the method of FIG. 1;

DESCRIPTION OF THE FUNDAMENTALS

Figure 3:
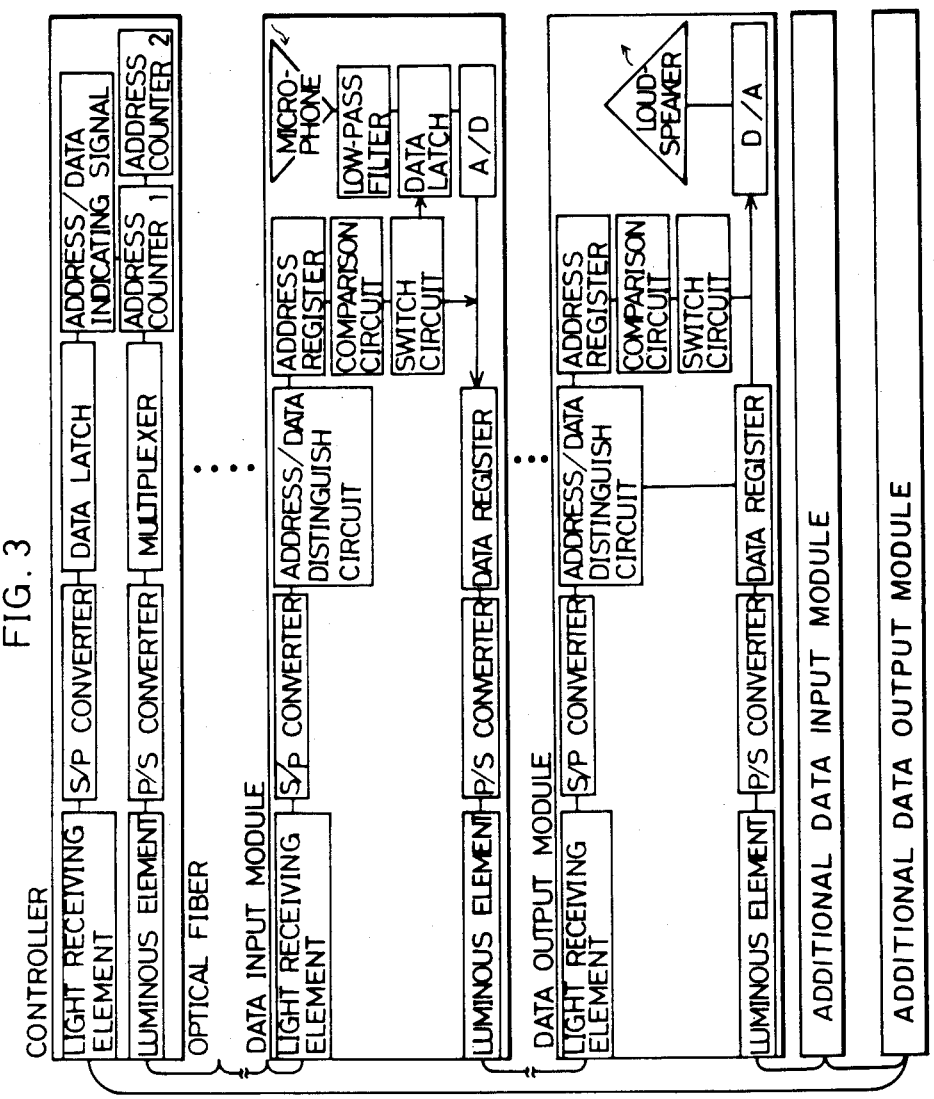
FIG. 3 shows a data way system to which the method of FIG. 1 may be effectively applied.
Figure 4:
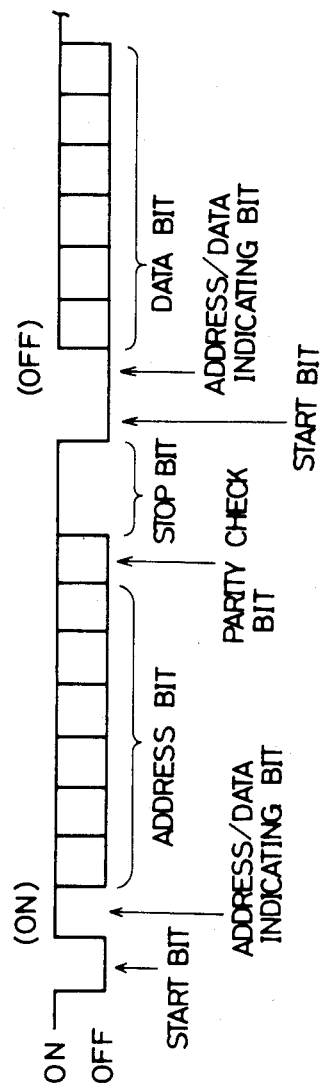
FIG. 4 shows a pulse train which may be employed for the method of FIG. 1.

Referring now to FIG. 1, description will be made of the fundamentals of the present sound transmission method. In FIG. 1, the left-hand and right-hand drawings show the present method and the conventional method, respectively. The present method as shown in FIG. 1 is for a data way system including more than two data input modules and more than two data output modules and wherein one or some of the data input modules are constructed as a sound input module or modules, while one or some of the data output modules are constructed as a sound output module or modules. For the present method, the sound input and output modules are given the address 0 (zero) while other addresses starting from 1 are assigned to the otherrespective data input and output modules. According to the present method, the address 0 is specified more frequently than the other addresses so as to address the sound input and output modules at shorter intervals.

Assume now that the number of the modules is n in all and that a combination of address and data makes one complete pass through a data transmission loop at a frequency of A Hz. Conventionally the address 0 has been specified at a frequency of A/n Hz, while it is specified at a frequency of A/2 Hz according to the present invention. Therefore, according to the invention, if n is 3 or larger, the data transmission frequency is increased so that the sound which could not be heard by A/n Hz may be audible.

According to the present method, sound is converted into electric signals by a suitable sound-to-electricity converter means, such as a microphone, in the sound input modules. Sound is passed through a low-pass filter to remove extraneous noise therefrom, as well known in the art, before it is sampled under A/2 Hz. The sound sampled is converted into a digit, and as such is transmitted. On the output side, this data is converted into an analog, and changed into sound by a suitable electricity-to-sound converter means such as a loudspeaker.

DESCRIPTION OF THE PREFERRED EMBODIMENT

Referring to FIG. 2, description will be made of one example of the present sound transmission method. In the example of FIG. 2, six-bit words are used for transmission of addresses and data. In this case, therefore, the maximum of 64 data input mudules and 64 data output modules may be used. A combination of address and data makes one complete pass through a transmission loop at a frequency of 40 KHz. Four addresses 0 to 3 are assigned to sound input modules and sound output modules, and these addresses are specified more frequently than the other addresses, so as to address each sound I/O module (i.e., each sound input module and sound output module) at a frequency of 8 KHz. Thus it is possible to obtain such a sound as has a quality substantially equal to that of the sound provided by telephones. In other words, the method of FIG. 2 provides a 4-channel talking circuit. On the other hand, according to the conventional method, the sound modules would be addressed at a frequency of 625 Hz, thus producing almost inaudible sound. Although the method of FIG. 2 may not be perfect in that the other data modules than the sound I/O modules are addressed at a lower frequency of 131 Hz, such an addressing frequency is sufficient to transmit data that is not varied at so high a rate, such as temperature. Also, according to the method of FIG. 2, sound signals are converted into six bits, and such a degree of transmission accuracy is sufficient to reproduce the sound suitable for all practical purposes.

The method of FIG. 2 may be carried out by using a data way system shown in FIG. 3. In the system of FIG. 3, a controller and data I/O modules are connected to one another by means of a series of optical fibers which, as a whole, makes a single loop while linking the controller and modules together. Thus in this system, data and addresses are transmitted in a serial manner. Also, they are sent by optical signals. For this purpose, the controller as well as each module is provided with a luminous element, a light receiving element, a serial-parallel converter and a parallel-serial converter. The controller also includes a circuit for generating an address/data indicating signal so as to allow each module to determine which of two signals, i.e., address signal or data signal, has been received thereby. This signal is a 1-bit signal changed in its condition (as hereinafter described) whenever a data or address has made one complete pass through the loop. Two counters 1 and 2 are also provided in the controller. The counter 1 operates to circulate through 0 (zero) to 3, and when the counter 1 has overflowed, the counter 2 operates only once. The counter 2 operates to circulate through 4 to 63. These functions of the counters make possible such an addressing as shown in FIG. 2. The controller is adapted to emit a pulse train consisting of a 1-bit start pulse ("off" pulse), the foregoing 1-bit address/data indicating pulse, a 6-bit pulse for representing a data or address, a 1-bit parity check pulse, and a 2-bit stop pulse ("on" pulse). When the address/data indicating pulse is in "on" condition, the next 6-bit pulse represents an address; in other words, when the former pulse is in "on" condition, it indicates that the latter pulse is an address pulse. When the address/data indicating pulse is in "off" condition, the next 6-bit pulse represents a data; in other words, when the former pulse is in "off" condition, it indicates that the latter pulse is a data pulse. The 6-bit pulse will be hereinafter referred to as an address block when representing an address, and as a data block when representing a data. Each data module receives the pulse train originally emitted from the controller, and converts the pulses into parallel ones and determines whether the pulse train contains an address block or a data block. If th pulse train contains an address block, each module then determines whether the address represented by that pulse is the same as that of the module.

Each module is provided with 6-bit dip switches with which to specify an address for the module. If desired, however, a ROM instead of dip switches may be provided in each module for storing its address.

Each data module includes a data register, and If the pulse train received by the module is of a data block, the data is temporarily memorized by the data register. And unless the last address block received thereby has specified the address of that module, the module reproduces the same data block as received from the controller or the preceding module and sends it to the next module. When each module has received an address block (or a pulse train containing an address block), the module reproduces the same address block as received and sends it to the next module, whether the address block received thereby has specified the address of that module or not.

The sound input module includes a microphone, a low-pass filter and a analog-to-digital converter in addition to other devices. Sound is converted into electric current by the microphone, which current is then passed through the low-pass filter adapted to transmit only those frequencies not exceeding one half of a sampling frequency (8 KHz in the embodiment of FIG. 2). That is, all frequencies exceeding 4 KHz (in the embodiment of FIG. 2) are removed to prevent a distortion of the electric signal. If the address of the sound input mod-module module is specified, the switch circuit of that module is made to convert the loudness of the sound at that point of time into a digital data by the analog-to-digital converter. The digital data thus obtained is memorized by the data register. And, thereafter, all data blocks that will follow the address block which has specified the foregoing module have their data changed into the foregoing digital data. The sound output module includes a digital-to-analog converter and a loudspeaker in addition to other devices. If the address of the sound output module is specified, the module memorizes the data of the data block which will follow the address block that has specified that module (which data is a digital data given to its data block in the foregoing manner), by its data register, and converts the memorized data into an analog data by the converter, so as to produce sound from the loudspeaker.

In the foregoing operations, the sound input and output modules are addressed at a frequency of 8 KHz, and so sound of adequate quality may be transmitted.

According to the present method, sound signals of adequate quality may be transmittedby a data way system manufactured under very common specifications. In particular, the present method can be applied to an existing data way system without modifying the interface circuits of the data input and output modules thereof in any way, but only requires a modification of the address counters of the control section for application thereto, so as to provide a sound transmission system that will perform well.

Although the present method is for transmission of sound, it may also be useful where data transmission must be effected with no time lag; for example, it may be effectively used to interrupt power supplied instantly when an instantaneous wind velocity has exceeded a given limit.

Different variations of the invention may be apparent to those skilled in the art. Accordingly, the invention is not considered to be limited to the specific embodiment described herein, but only as set forth by the appended claim.

What is claimed is:

1. A method of effecting a data way system comprising
   (i) interconnecting with data transmission lines at least one controller, more than two data input modules and more than two data output modules to form a loop, each said module having a single address assigned thereto in advance, said controller being adapted to specify the address of any one of said data input modules to input a data into the loop, at least one of said data input modules including a sound-to-electricity converter such as a microphone, a low-pass filter circuit and an analog-to-digital converting circuit so as to provide a second input module, and at least one of said data output modules including a digital-to-analog converting circuit and an electricity-to-sound converter so as to provide a cound output module, and
   (ii) causing said controller to address a said sound input module for causing said sound input module to put data representative of sound into the loop, and to address a said sound output module for causing said sound output module to convert data from the loop into a sound output, and to address said sound input module and said sound output module at a frequency greater than said other data input and output modules so that said system relays sound and data between selected said modules with fidelity.

2. The method of claim 1, wherein the data way system has a characteristic message transmission frequency A and includes n different addresses of sound modules, and wherein step (ii) includes addressing each sound module at a rate greater than $A/(n+1)$.

3. The method of claim 1, wherein the data way system has a characteristic message transmission frequency A and includes n different addresses of sond modules and m non-sound data modules, and wherein step (ii) includes addressing each said non-sound data module at a rate not more than $A/nm$.

4. The method of claim 1, wherein the data way sytem has a characteristic message transmission frequency A, and wherein step (ii) includes addressing each said sound module at a fixed frequency $A/(n+1)$ and addressing each non-sound module at a second rate which is a divisor of said first rate, where n is the number of addresses of sound modules in said system.

5. The method of claim 1, wherein step (ii) includes the step of addressing a second module with a frequency which is substantially an integral multiple of the frequency for addressing a non-sound data module.

* * * * *

UNITED STATES PATENT AND TRADEMARK OFFICE
CERTIFICATE OF CORRECTION

PATENT NO. : 4,827,256

DATED : 2 May 1989

INVENTOR(S) : Makoto Yokoyama

It is certified that error appears in the above-identified patent and that said Letters Patent is hereby corrected as shown below:

Column 2, line 68, replace "mudules" with --modules--.

Column 3, line 29, after "Thus" insert --,--.

Column 3, line 66, replace "th" with --the--.

Column 4, line 49, replace "transmittedby" with --transmitted by--.

Column 6, line 11, replace "sond" with --sound--.

Column 6, line 23, replace "second" with --sound--.

Signed and Sealed this

Seventeenth Day of April, 1990

*Attest:*

HARRY F. MANBECK, JR.

*Attesting Officer*      *Commissioner of Patents and Trademarks*